(12) United States Patent
Yoshizawa

(10) Patent No.: US 8,937,647 B2
(45) Date of Patent: Jan. 20, 2015

(54) STEREOSCOPIC IMAGING SYSTEM, RECORDING CONTROL METHOD, STEREOSCOPIC IMAGE REPRODUCTION SYSTEM, AND REPRODUCTION CONTROL METHOD

(75) Inventor: Yasuo Yoshizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/548,576

(22) Filed: Jul. 13, 2012

(65) Prior Publication Data

US 2013/0021450 A1    Jan. 24, 2013

(30) Foreign Application Priority Data

Jul. 22, 2011   (JP) .................................. 2011-160642

(51) Int. Cl.
*H04N 13/02* (2006.01)
*H04N 13/04* (2006.01)
*H04N 9/82* (2006.01)
*G11B 27/00* (2006.01)
*H04N 9/79* (2006.01)
*G03B 35/08* (2006.01)

(52) U.S. Cl.
CPC .............. *H04N 9/8227* (2013.01); *G11B 27/00* (2013.01); *H04N 13/0239* (2013.01); *H04N 13/0296* (2013.01); *H04N 9/7921* (2013.01); *G03B 35/08* (2013.01)
USPC ............................................. 348/47; 348/51

(58) Field of Classification Search
USPC ............. 348/42, 46, 47, 51; 359/462; 352/57; 356/12; 396/324

IPC ............................................ H04N 13/02,13/04
See application file for complete search history.

(56) References Cited

U.S. PATENT DOCUMENTS

2012/0242805 A1* 9/2012 Tyou .............................. 348/47

FOREIGN PATENT DOCUMENTS

JP              7-231420              8/1995

* cited by examiner

*Primary Examiner* — Sherrie Hsia
(74) *Attorney, Agent, or Firm* — Frommer Lawrence & Haug LLP; William S. Frommer

(57) ABSTRACT

A stereoscopic imaging system includes: first and second imaging control units respectively controlling the operation of first and second imaging devices outputting first and second image signals in first and second processing frames according to incident light on a subject through first and second lenses; first and second access control units respectively controlling access to first and second image signal recording mediums recording the first and second image signals in the first and second processing frames; a first synchronization control unit notifying, if the capacity of a first image signal recording medium accessed by the first access control unit is insufficient, the timing of switching access to another first image signal recording medium; and a second synchronization control unit controlling switching access to another second image signal recording medium different from the second image signal recording medium accessed by the second access control unit in synchronization with the notified timing.

12 Claims, 10 Drawing Sheets

WHEN CAPTURING 3D IMAGE

WHEN EDITION

STEREOSCOPIC IMAGING SYSTEM, RECORDING CONTROL METHOD, STEREOSCOPIC IMAGE REPRODUCTION SYSTEM, AND REPRODUCTION CONTROL METHOD

FIELD

The present disclosure relates to a stereoscopic imaging system, a recording control method, a stereoscopic image reproduction system, and a reproduction control method which are suitably applied, for example, when generating stereoscopic image (3D image) from images captured by two cameras.

BACKGROUND

In the related art, a technique which generates a stereoscopic image (3D image) allowing a user to stereoscopic view using images of the same subject captured by two cameras installed to match the parallax of the left and right eyes of the user is known. In order to capture a stereoscopic image, it is necessary to match the start or stop operations of image recording or the start or stop operations of image reproduction (hereinafter, referred to as "processing start/stop") by the two cameras.

A camera manages an image file, in which an image signal generated from the start to the end of a single recording is recorded, in terms of "clips", such that the image file can be written or read with respect to a recording medium in terms of clips. If a slot switch button is depressed on either the L or the R-side camera for 3D imaging or if the capacity of the recording medium is filled, the camera is automatically switched to another recording medium inserted into the switched slot to continue image recording or reproduction.

JP-A-7-231420 describes a technique relating to a still camera which records an image signal on a plurality of recording mediums.

SUMMARY

In the stereoscopic imaging system of the related art, there is no link function which synchronously controls the mutual operation between the two cameras. For this reason, even when the user performs an operation input on the two cameras, since the timing of the operation input is shifted, the two cameras may not start or stop the processing simultaneously, making it difficult to switch the recording mediums loaded in a plurality of slots simultaneously. Even when one slot is switched because the capacity of the medium for the left image or for the right image is filled during 3D image capturing, the other slot is not switched. Accordingly, the clips of the left image and the right image may be different in length when recorded.

With regard to the start or stop timing of the processing in the two cameras, if the processing frames of image signals captured or reproduced by the cameras do not match exactly, a sense of discomfort is caused in an image to be reproduced in a stereoscopic view, and an incomplete stereoscopic image is obtained. In the related art, after imaging, it is necessary to match the start/stop timings of processing frames using the time codes or the like appended to the clip files generated by the two cameras as a separate work. However, if the clip files of the left and right images are different in length, it is necessary to exactly match the start timings of the left and right images again when synchronously editing or reproducing the left and right images, resulting in considerable inconvenience.

JP-A-7-231420 describes only a technique in which the single camera continuously records image signals on a plurality of recording mediums, and exact control of image recording or reproduction when two cameras are used so as to capture a stereoscopic image is not considered.

It is therefore desirable to accurately match the switch timings of recording mediums when the recording mediums are switched during stereoscopic image capturing or reproduction.

An embodiment of the present disclosure has the following configuration. First, the operation of a first imaging device outputting a first image signal in a first processing frame according to incident light on a subject incident through a first lens is controlled. Next, a first access control unit controls access to a plurality of first image signal recording mediums recording the first image signal in the first processing frame.

The operation of a second imaging device arranged at a predetermined distance from the first lens to output a second image signal in a second processing frame according to incident light on the subject incident through a second lens is controlled. At this time, a second access control unit controls access to a plurality of second image signal recording mediums recording the second image signal in the second processing frame.

If the remaining capacity of a first image signal recording medium to be accessed by the first access control unit is insufficient, the timing of switching access to another first image signal recording medium different from the first image signal recording medium is notified.

Control is performed for switching access to another second image signal recording medium different from the second image signal recording medium to be accessed by the second access control unit in synchronization with the notified timing.

Another embodiment of the present disclosure has the following configuration. First, a first access control unit controls access to a plurality of first image signal recording mediums reproducing a first image signal in a first processing frame. Next, a second access control unit controls access to a plurality of second image signal recording mediums reproducing a second image signal in a second processing frame.

If a file of the first image signal which is reproduced from the first image signal recording medium to be accessed by the first access control unit is not present, the timing of switching access to another first image signal recording medium different from the first image signal recording medium is notified.

Control is performed for switching access to another second image signal recording medium different from the second image signal recording medium to be accessed by the second access control unit in synchronization with the notified timing.

In this way, it is possible to synchronously perform the process for switching access to the recording mediums respectively having the left and right images recorded thereon at the timing at which the instructed operation starts when the predetermined period elapses.

According to the embodiments of the present disclosure, during a process for capturing or reproducing a stereoscopic image, the first synchronization control unit notifies the second synchronization control unit of the timing at which the second synchronization control unit switches access to the second image signal recording medium when the predetermined period elapses. For this reason, the first and second synchronization control units can switch access to the recording mediums at the same timing, thereby increasing precision of access switching of the recording mediums and making the clips at the same length when recording the left and right images.

DETAILED DESCRIPTION

Hereinafter, modes for carrying out the present disclosure (hereinafter, referred to as an embodiment) will be described. The description will be provided in the following sequence.
1. Embodiment (synchronization control of two cameras: example of stereoscopic imaging system)
2. Modification

1. Embodiment

Example of Synchronization Control of Two Cameras

Hereinafter, an embodiment (hereinafter, referred to as "this example") of the present disclosure will be described with reference to the accompanying drawings. In this embodiment, as an example, a stereoscopic imaging system 10 which synchronizes the switch timings of recording mediums recording image signals of left and right images using two cameras to capture a stereoscopic image will be described. The stereoscopic imaging system 10 is also used as a stereoscopic image reproduction system which reproduces a stereoscopic image, and a program is executed to realize a recording control method and a reproduction control method which are executed by internal blocks in cooperation.

Figure 1:
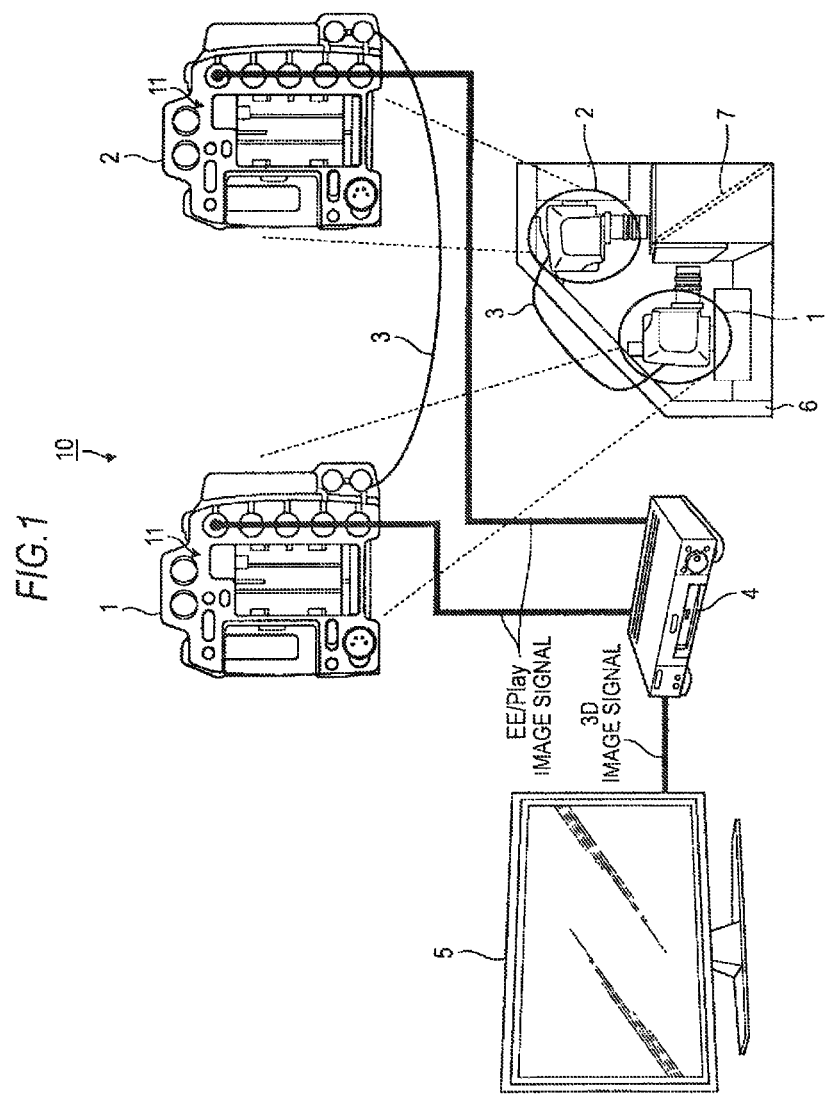
FIG. 1 is an appearance diagram showing an external configuration example of a stereoscopic imaging system according to an embodiment of the present disclosure.

FIG. 1 shows an external configuration example of the stereoscopic imaging system 10.

The stereoscopic imaging system 10 includes a first camera 1 and a second camera 2 as an imaging device which captures two-dimensional images of the same image size with the same number of frames. The first camera 1 captures a left image and generates a first image signal which is a left image signal. The second camera 2 captures a right image and generates a second image signal which is a right image signal. The first camera 1 and the second camera 2 include a common line terminal. The first camera 1 and the second camera 2 are connected to the line terminal and mutually transmit and receive communication packets with a synchronization control signal including a control command for synchronizing processing, such as image recording or reproduction, in terms of frames by a synchronization control line 3 through which serial communication can be performed.

Each of the first camera 1 and the second camera 2 includes an operating unit 11 on which the user instructs the operations of respective units through an operation input. For the operating unit 11, for example, an operating switch (a record button, a play button, or the like) in a camera body, a remote controller (not shown), a push button, a toggle switch, a touch panel display, and the like are used. The operating unit 11 is used to instruct an operation to switch access from a first image signal recording medium 22L to a first image signal recording medium 23L according to a user's operation input. In this example, control is performed with a master and slave relationship where the first camera 1 is a master and the second camera 2 is slave. The synchronization of a processing frame of the second camera 2 is controlled to match a processing frame of the first camera 1 by an instruction of the first camera 1.

The stereoscopic imaging system 10 also includes a signal conversion device 4 which converts image signals input from the first camera 1 and the second camera 2 to a 3D image signal. The signal conversion device 4 outputs a 2D or 3D image signal to a display device 5 which can display an image in 2D or 3D.

The signal conversion device 4 receives an EE (Electric to Electric Mode) image signal or a Play image signal from the first camera 1 and the second camera 2. The EE image signal is a signal which instructs the display device 5 to directly display the 2D image signals captured by the first camera 1 and the second camera 2 as 2D images. That is, the EE image signal is a signal which extracts the image signals output from the first camera 1 and the second camera 2 as an output to the display device 5 without passing through a storage unit, such as an HDD. The Play image signal is a signal which instructs the display device 5 to display the 2D image signals reproduced by the first camera 1 and the second camera 2 as a 3D image.

The signal conversion device 4 outputs a communication packet, in which the 2D image signals input from the first camera 1 and the second camera 2 are combined as a 3D image signal, to the display device 5. When a 2D display mode in which the display device 5 displays a 2D image is set, the image signals input from the first camera 1 and the second camera 2 are selected, and an image selected from the left and right images is displayed as a 2D image. When a 3D display mode in which the display device 5 displays a stereoscopic image is set, the image signals are displayed as a 3D image.

The first camera 1 and the second camera 2 are installed on an installation base (RIG) 6 when capturing a stereoscopic image. In general, the first camera 1 and the second camera 2 have the same zoom magnification, and the first camera 1 and the second camera 2 are arranged at the lens interval corresponding to the human eyes. It is found that the user can view a stereoscopic image obtained by combining the 2D images captured at this time as a natural stereoscopic object.

However, if the first camera 1 and the second camera 2 having a large housing are arranged in the horizontal direction, a subject is imaged with a parallax wider than the width of the human eyes, and a sense of discomfort is caused with a stereoscopic image when the user views the stereoscopic image. For example, even if the parallax is narrowed, an image in which a subject at a place near the first camera 1 and the second camera 2 can be viewed in a stereoscopic view can be imaged. Meanwhile, in order to capture an image for a stereoscopic view without causing a sense of discomfort, as the parallax is widened, it is necessary to increase the distance between the subject and the first camera 1 and the second camera 2. For this reason, the first camera 1 and the second camera 2 are installed on the installation base 6 having a half mirror 7. At this time, the first camera 1 is arranged at a position where image light of the subject is input directly through the half mirror 7, and the second camera 2 is arranged at a position where image light of the subject is reflected by the half mirror 7 and input. In this way, the first camera 1 and the second camera 2 are installed at the positions where the optical axes of the lenses in the first camera 1 and the second camera 2 cross each other at right angles.

Figure 2:
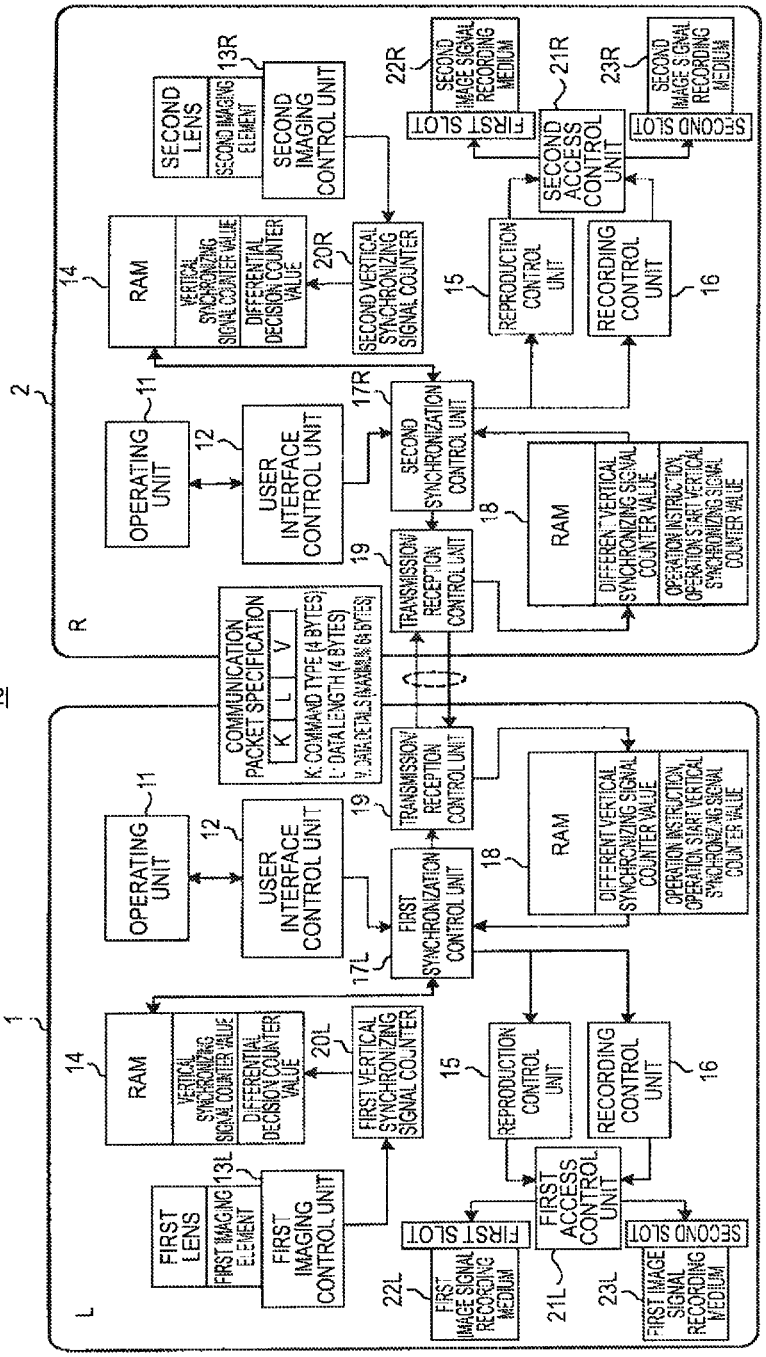
FIG. 2 is a block diagram showing an internal configuration example of the stereoscopic imaging system according to the embodiment of the present disclosure.

FIG. 2 shows an internal configuration example of the stereoscopic imaging system 10.

The first camera 1 and the second camera 2 mostly have the same functional blocks. For this reason, in the following description, is attached to the reference numerals representing the functional blocks of the first camera 1, and "R" is attached to the reference numerals representing the functional blocks of the second camera 2 corresponding to the functional blocks of the first camera 1. In the following description, when describing the processing of the first camera 1, the first camera 1 is called "a host camera", and the second camera 2 is called "another camera".

The first camera 1 includes a user interface control unit 12 which receives an operation input from the operating unit 11, a first imaging control unit 13L which controls an imaging operation, and a RAM 14. When the operating unit 11 is a touch panel display, the user interface control unit 12 displays a graphical user interface (GUI) on the screen. The first camera 1 also includes a reproduction control unit 15 which controls reproduction of an image recorded in a storage unit (not shown), and a recording Control unit 16 which performs control when recording an image in a storage unit. The first camera 1 also includes a first synchronization control unit 17L which controls the operation of the second camera 2 such that an imaging operation or image reproduction or recording is performed in synchronization with the processing of the second camera 2. The first camera 1 also includes a RAM 18 which records various counter values, and a transmission/reception control unit 19 which controls transmission and reception of a communication packet to be transmitted through the synchronization control line 3.

The first camera 1 also includes a first access control unit 21L which receives an instruction to reproduce a left image by the reproduction control unit 15 or an instruction to record a left image by the recording control unit 16. The first access control unit 21L controls access, such as data reading/writing, to a plurality of first image signal recording mediums 22L and 23L recording a first image signal in a first processing frame or monitors the states of the first image signal recording mediums 22L and 23L. The first access control unit 21L accesses one of the first image signal recording mediums 22L and 23L in turn, and reproduces or records an image signal of a left image. The first image signal recording mediums 22L and 23L are inserted into two slots (first and second slot), and recording or reproduction of the first image signal is performed in each slot. A second access control unit 21R in the second camera 2 controls access to a plurality of second image signal recording mediums 22R and 23R recording a second image signal in a second processing frame or monitors the states of the second image signal recording mediums 22R and 23R.

The first access control unit 21L performs an access process cyclically using the first image signal recording mediums 22L and 23L. For example, if the storage capacity of the first image signal recording medium 22L inserted into the first slot is filled when recording the first image signal, access is automatically switched to the first image signal recording medium 23L inserted into the second slot to record the rest of the first image signal. The second camera 2 includes the second access control unit 21R having the same function as in the first camera 1 and two slots. The second image signal recording mediums 22R and 23R inserted into the respective slots record an image signal of a right image. The second access control unit 21R in the second camera 2 reproduces or records an image signal of a right image as a second image signal cyclically using the second image signal recording mediums 22R and 23R. In the following description, the first image signal recording mediums 22L and 23L and the second image signal recording mediums 22R and 23R may be abbreviated as "recording mediums".

The user interface control unit 12 performs a process for receiving an operation input by a button (not shown) in the operating unit 11, a process for receiving an operation input from a remote controller (not shown), and a process for receiving an operation input by a remote, such as a wireless LAN. The user interface control unit 12 processes an instruction according to an operation input from a graphical user interface, such as a touch panel, and performs a process for displaying various menus or messages on a touch panel display or the like. The user interface control unit 12 notifies an instruction according to an operation input received from the operating unit 11 to the first synchronization control unit 17L.

The first imaging control unit 13L controls the operation of a first imaging device outputting the first image signal in the first processing frame for each vertical synchronizing signal to be inserted for the first processing frame according to incident light on the subject incident through a first lens. The second camera 2 has a second imaging control unit 13R which controls the operations of a second lens and a second imaging device. For the first and second imaging devices, for example, CMOS (Complementary Metal Oxide Semiconductor) image sensors or the like are used. The second imaging control unit 13R controls the operation of the second imaging device arranged at a predetermined distance from the first lens to output the second image signal in the second processing frame according to incident light on the subject incident through the second lens. The first imaging control unit 13L controls the driving of, for example, an optical system driving unit including the first imaging device, an image processor, the first lens, and the like. The first imaging control unit 13L corrects the image signal output from the first imaging device in terms of pixels or performs control for an autofocus process or an auto white balance process on the optical system driving unit.

The RAM 14 is written with a vertical synchronizing signal counter value, which is used as the number of frames of a processing frame, by a first vertical synchronizing signal counter 20L which counts the number of generated vertical synchronizing signals in each frame obtained from the first imaging control unit 13L. The first vertical synchronizing signal counter 20L is used as a first counting unit which counts the number of generated vertical synchronizing signals to be inserted for the first processing frame by the first imaging device as the number of frames of the first processing frame. The first vertical synchronizing signal counter 20L counts the number of vertical synchronizing signals interrupted from the first imaging device controlled by the first imaging control unit 13L when imaging, and the RAM 14 records the number of vertical synchronizing signals written by the first vertical synchronizing signal counter 20L. A second vertical synchronizing signal counter 20R in the second camera 2 is used as a second counting unit which counts the number of generated second vertical synchronizing signals to be inserted for the second processing frame by the second imaging device, and the number of generated second vertical synchronizing signals is recorded in the RAM 14.

The reproduction control unit 15 performs control for an access process, such as clip file writing and reading, to the first image signal recording medium 22L and the first image signal recording medium 23L through the first access control unit 21L, clip information processing, and a clip file decoding process. The recording control unit 16 performs control for an access process to the first image signal recording medium 22L and the first image signal recording medium 23L, a clip file generation process, a salvaging process for restoring a deleted clip file, and an image signal encoding process.

If the remaining capacity of a first image signal recording medium to be accessed by the first access control unit 21L is insufficient, the first synchronization control unit 17L notifies the timing of switching access to another first image signal recording medium different from the first image signal recording medium. In this example, if the remaining capacity of the first image signal recording medium 22L is insufficient, access is switched to the first image signal recording medium 23L. The second synchronization control unit 17R performs control for switching access to another second image signal recording medium different from a second image signal recording medium to be accessed by the second access control unit 21R in synchronization with the notified timing. In this example, access is switched from the second image signal recording medium 22R to the second image signal recording medium 23R. When the remaining capacity of the first image signal recording medium 23L inserted into the second slot is insufficient, a process for switching access to the first image signal recording medium 22L is performed. At this time, in the second camera 2, access is switched from the second image signal recording medium 23R to the second image signal recording medium 22R.

Specifically, when the first access control unit 21L switches access from the first image signal recording medium 22L to the first image signal recording medium 23L, the first synchronization control unit 17L performs the following process. That is, the number of generated vertical synchronizing signals inserted for the second processing frame is calculated from the differential between the number of generated vertical synchronizing signals inserted for the second processing frame and the number of generated vertical synchronizing signals inserted for the first processing frame. The following control is performed on the basis of the number of generated vertical synchronizing signals inserted for the second processing frame. That is, when a predetermined period elapses after the timing of switching access to the first image signal recording medium 23L has been notified to the second access control unit 21R, the first access control unit 21L performs control for switching access to the first image signal recording medium 23L. The second synchronization control unit 17R informs the first synchronization control unit 17L of the number of generated vertical synchronizing signals inserted for the second processing frame. When the predetermined period elapses after the notification has been received from the first synchronization control unit 17L, the second access control unit 21R performs control for switching access from the second image signal recording medium 22R to the second image signal recording medium 23R.

The first synchronization control unit 17L matches the generation timings of the vertical synchronizing signal of the first processing frame and the vertical synchronizing signal of the second processing frame in advance. The second synchronization control unit 17R counts the number of generated vertical synchronizing signals inserted for the second processing frame as the number of frames of the second processing frame. At this time, it is determined whether or not the differential in the number of frames between the number of frames of the second processing frame received from the second camera 2 each time the second imaging device generates a vertical synchronizing signal and the number of frames of the first processing frame is constant in a plurality of frame periods. When the differential is constant in a plurality of frame periods, the number frames obtained by adding a plurality of frame periods to the calculated number of frames of the second processing frame is notified to the second camera 2 as the timing at which the second camera 2 starts an operation. With this control, the first camera 1 controls the timing at which the second camera 2 starts an operation to be instructed.

The first synchronization control unit 17L notifies an instruction according to an operation input of the operating unit 11 to the second synchronization control unit 17R, and performs the notified operation when a predetermined period elapses after the operation input has been made. The second synchronization control unit 17R switches access from the second image signal recording medium 22R to the second image signal recording medium 23R when a predetermined period elapses after the notification has been received from the first synchronization control unit 17L. The "operation to be instructed" according to an operation input of the operating unit 11 includes either imaging start/stop or image reproduction start/stop, and the first and second processing frames include either an imaging frame or a reproduction frame.

In this way, the first synchronization control unit 17L calculates the differential in the vertical synchronizing signal counter value between the first camera 1 and the second camera 2, or performs control for synchronizing the operation instruction timing with the second camera 2. The details of the process in the first synchronization control unit 17L are shown in the flowcharts of FIGS. 7 to 10.

The first synchronization control unit 17L has an interface which transmits and receives data with respect to the first imaging control unit 131, and performs a transmission/reception control unit interface process for the transmission/reception control unit 19. This process is performed by a module which is assigned to an interface for the transmission/reception control unit 19. The RAM 18 records the vertical synchronizing signal counter values received between the first camera 1 and the second camera 2, the vertical synchronizing signal counter value which becomes the trigger of an operation instruction by the first camera 1 or the start of the operation instruction, and the like.

The transmission/reception control unit 19 performs a process for transmitting and receiving a communication packet, a process for sending a communication packet to the second camera 2, a process for converting a communication packet in accordance with a prescribed communication protocol, a process for controlling a communication device including a line terminal, and the like. The first synchronization control unit 17L calculates the start timing (in this example, based on the number of generated vertical synchronizing signal counter values) of a processing frame for synchronizing the start or stop timing of processing. The first synchronization control unit 17L requests the transmission/reception control unit 19 to send control data for instructing an operation to be performed in the second camera 2 and the number of processing frames to the second camera 2.

The first camera 1 performs a genlock on the second camera 2 to synchronize the start timing of the processing frame when imaging in the first camera 1 and the second camera 2. The synchronization is made at the generation timing of the vertical synchronizing signal, and the shift amount of the synchronization timing is controlled by the first synchronization control unit 17L to be within the time corresponding to one line.

The first camera 1 and the second camera 2 in which the start timing of the processing frame is synchronized by the genlock detect the differential between the vertical synchronizing signal counter values counted by software programs which run on the respective cameras to secure frame precision upon control. If the first camera 1 serving as a master receives a user's operation instruction for slot switching, the first camera 1 instructs the second camera 2 serving as a slave to perform slot switching simultaneously at the timing after one or several frames.

The vertical synchronizing signal appears at the timing at which the processing frame starts. The first synchronization control unit 17L of the first camera 1 grasps the number of frames of a processing frame for the operation of the second camera 2 on the basis of the differential. When the remaining capacity of the first image signal recording medium 22L is insufficient, and when switching from the first slot to the second slot is required or if an operation instruction for slot switching by a user's operation input is received, the first camera 1 performs the following operation. That is, the first camera 1 controls the operation of the second camera 2 to perform slot switching simultaneously with the first camera 1 at the timing after one or several frames. In this way, the first camera 1 performs synchronization control for matching the processing timing of the second camera 2 and each frame as the processing timing of the first camera 1.

A communication packet which is transmitted between the cameras includes "K field (four bytes)" representing the type of a command, "L filed" representing the data length (four bytes), and "V field (a maximum of 64 bytes)" representing the details of data. The K field stores data which instructs synchronization, and the V field stores the details of data representing the start of slot switching in the host camera. For example, if data representing notification of a vertical synchronizing signal counter value is included in the K field, the V field includes the vertical synchronizing signal counter value of the host camera. If information indicating the format of a clip file is included in the K field, the V field includes information representing the image size, frame rate, and bit rate of an image.

The first camera 1 and the second camera 2 which are controlled by the software programs transmit and receive communication packets through the synchronization control line 3, thereby performing the processing in synchronization with the respective frames. Accordingly, it becomes possible to perform an operation to start or stop recording of images captured at the same timing simultaneously in accordance with the respective frames, or to perform a process for reproducing or stopping the contents of the same format simultaneously in accordance with the respective frames. For this reason, when a synchronization control unit is divided between cameras or in a single camera, the respective synchronization control units perform asynchronous communication to detect the differential of the synchronous counter, thereby performing control for recording medium switching with frame precision.

The first camera 1 and the second camera 2 are also used as reproduction devices which synchronously reproduce images. In this case, the second camera 2 is used as another reproduction device which is connected through the synchronization control line 3. At this time, the first access control unit 21L controls access to a plurality of first image signal recording mediums reproducing the first image signal in the first processing frame. The second access control unit 21R controls access to a plurality of second image signal recording mediums reproducing the second image signal in the second processing frame. If the file of the first image signal which is reproduced from the first image signal recording medium 22L to be accessed by the first access control unit 21L is not present, the timing of switching access to the first image signal recording medium 23L different from the first image signal recording medium 22L is notified. The second synchronization control unit 17R performs control for switching access to the second image signal recording medium 23R different from the second image signal recording medium 22R to be accessed by the second access control unit 21R in synchronization with the notified timing.

The operation instructed by the operation input of the operating unit 11 includes either imaging start/stop or access switching of the first and second image signal recording mediums. The first and second processing frames include either an imaging frame or a reproduction frame.

Figure 3:
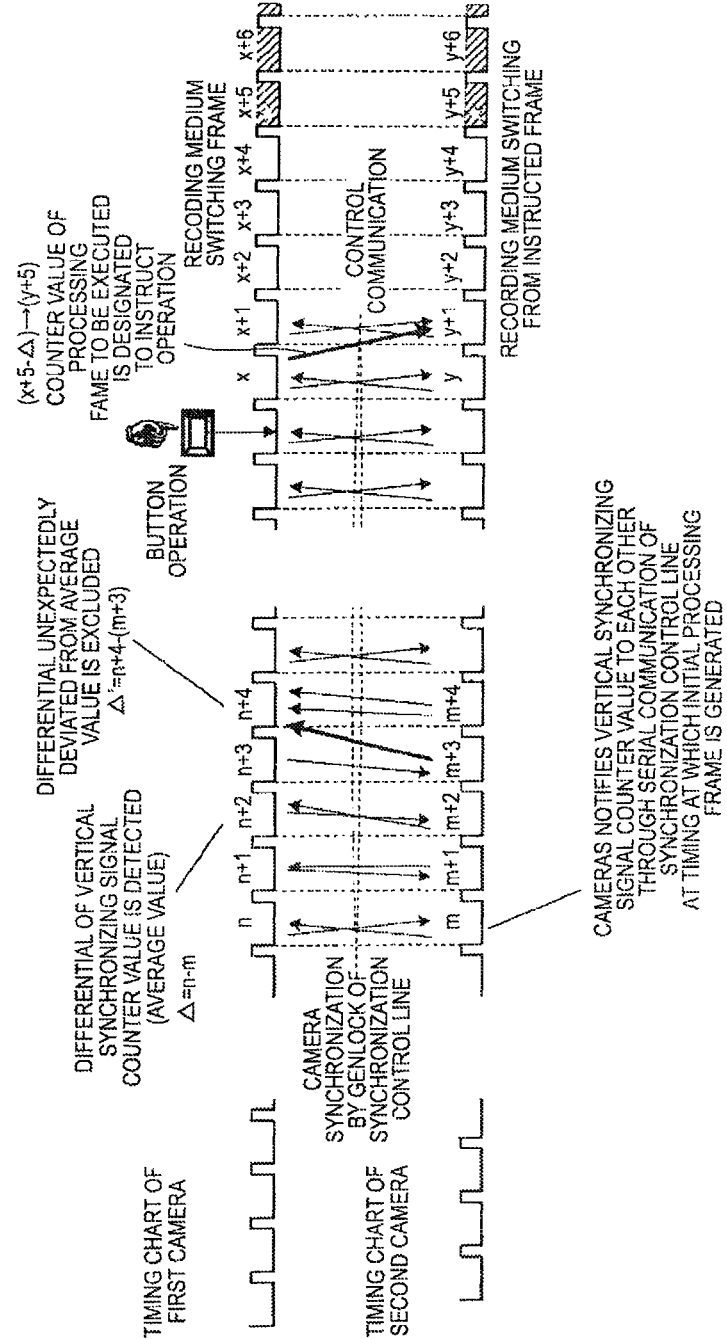
FIGS. 3A to 3C are timing charts showing an example where a first camera and a second camera control the slot switch timing according to the embodiment of the present disclosure.

FIGS. 3A to 3C are timing charts showing an example where the operation timing of the second camera 2 is controlled by the first camera 1. FIG. 3A shows an example of a timing chart in a state where the synchronization of the first camera 1 and the second camera 2 is not controlled.

The first camera 1 and the second camera 2 use the vertical synchronizing signals generated at different timings so as to match the start timings, and performs imaging or reproduction on the basis of a processing frame which is defined within a period of adjacent vertical synchronizing signals. While the first camera 1 and the second camera 2 operate in the processing frames of the same frame rate, for example, it is difficult to exactly match the timings at which the user operates the operating units 11 of the respective cameras to power on the cameras, and the rise timings of the processing frames are different. For this reason, as in the related art, if the subject is imaged in a state where the start timings of the processing frames are different, it is necessary to perform an operation to match the timings of the frames of the left and right images after imaging.

FIG. 3B shows an example of the processing frames of the second camera 2 genlocked on the basis of the processing frames of the first camera 1.

In this example, control is performed to match the start timing of the processing frame of the first camera 1 and the start timing of the processing frame of the second camera 2, and the vertical synchronizing signal of the first camera 1 is used as a synchronization signal for matching the start timings of the processing frames. The second camera 2 genlocks the processing frames by a synchronization control signal transmitted from the first camera 1 through the synchronization control line 3. Since the first camera 1 and the second camera 2 have the same configuration, the processing frames of the second camera 2 may be used as a synchronization signal to genlock the processing frames of the first camera 1.

The process for matching the start timings of the processing frames of the first camera 1 and the second camera 2 will be described.

First, the first camera 1 notifies the counted vertical synchronizing signal counter value to the second camera 2 through the synchronization control line 3 at the moment the vertical synchronizing signal is generated at the initial timing of the processing frame. The vertical synchronizing signal counter value is used as a counter value of a processing frame.

Similarly, the second camera 2 notifies the counted vertical synchronizing signal counter value to the first camera 1 through the synchronization control line 3 at the moment the vertical synchronizing signal is generated as the initial timing of the processing frame. In FIG. 3B, for convenience of description, the vertical synchronizing signal counter value of the first camera 1 is counted as n, n+1, . . . , and the vertical synchronizing signal counter value of the second camera 2 is counted as m, m+1, . . . .

The first camera 1 and the second camera 2 notify the vertical synchronizing signal counter values to each other for the period of one frame. This operation is performed over several frames. The first synchronization control unit 17L of the first camera 1 calculates the differential $\Delta$ by subtracting the vertical synchronizing signal counter value of the second camera 2 acquired over several frames from the vertical synchronizing signal counter value of the first camera 1. In this example, the value is obtained as the differential $\Delta$=n−m, and when the calculated differential $\Delta$ continuously has the same value over a plurality of frames, the differential $\Delta$ is calculated as an average value.

As in the (m+3)th frame of the second camera 2, there is a case where the counter value of the (m+3)th frame is not notified within the same (m+3)th frame of the first camera 1 and is notified in the next (m+4)th frame. For example, there is a case where the first synchronization control unit 17L is unable to notify the number of frames of the first processing frame to the second synchronization control unit 17R within the period of the first processing frame. There is also a case where the first synchronization control unit 17L is unable to receive the number of frames of the second processing frame from the second synchronization control unit 17R within the period of the first processing frame. At this time, the first synchronization control unit 17L notifies the number of frames of the first processing frame to the second synchronization control unit 17R over a frame period next to the first processing frame. Alternatively, the first synchronization control unit 17L receives the number of frames of the second processing frame from the second synchronization control unit 17R. Therefore, the first synchronization control unit 17L and the second synchronization control unit 17R can reliably notify the number of frames of the processing frame to each other.

As shown in FIG. 3B, when a second differential $\Delta'$ different from the same differential $\Delta$ calculated equal to or greater than a predetermined number of times is calculated less than the predetermined number of times, the first synchronization control unit 17L discards the second differential $\Delta'$. In the example of FIG. 3B, the second differential $\Delta'$ is calculated as $\Delta'$=(n+4)−(m+3)=n−m+1, and the second differential $\Delta'$ which is unexpectedly deviated from the average value is discarded. In this way, the first synchronization control unit 17L of the first camera 1 can grasp how much the processing frame of the second camera 2 is shifted relative to the processing frame of the first camera 1 on the basis of the differential $\Delta$.

FIG. 3C shows an example of the timing at which the first camera 1 and the second camera 2 actually perform slot switching.

As shown in FIG. 3B, the first synchronization control unit 17L of the first camera 1 grasps the differential $\Delta$. In FIG. 3C, for convenience of description, the processing frame of the first camera 1 is counted as x, x+1, . . . , and the processing frame of the second camera 2 is counted as y, y+1, . . . .

When performing slot switching from the (x+5) th frame, the first synchronization control unit 17L instructs the second camera 2 to overwrite the counter value of the (x+5−$\Delta$) th frame with the counter value of the (y+5)th frame. At this time, the first synchronization control unit 17L of the second camera 2 rewrites the counter value of the (y+5) th frame to the counter value of the (x+5−$\Delta$)th frame. Therefore, the first camera 1 and the second camera 2 can perform slot switching at the same timing indicated by an asterisk in the drawings as the counter value of the same frame.

Figure 4:
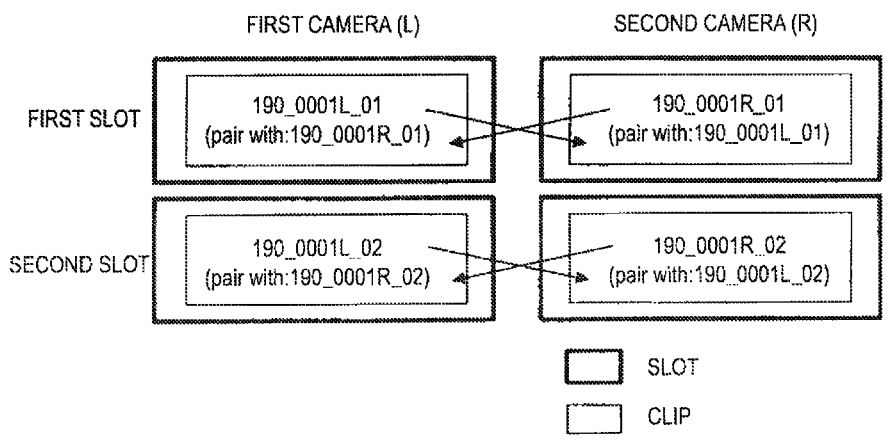
FIG. 4 is an explanatory view showing a configuration example of a clip file which is recorded on a recording medium to be used in the first camera and the second camera according to the embodiment of the present disclosure.

FIG. 4 shows a configuration example of a clip file which is recorded on a recording medium to be used in the first camera 1 and the second camera 2.

It is assumed that the first image signal recording mediums 22L and 23L and the first image signal recording mediums 22R and 23R are inserted into the first and second slots of the first camera 1 and the second camera 2.

The first access control unit 21L records the first image signal on the first image signal recording mediums 22L and 23L in terms of clips, and notifies the clip name of the first image signal to the second synchronization control unit 17R. The first access control unit 21L also performs control for recording the clip name of the second image signal received from the second synchronization control unit 17R on the first image signal recording mediums 22L and 23L. The second access control unit 21R records the second image signal on the second image signal recording mediums 22R and 23R in terms of clips, and notifies the clip name of the second image signal to the first synchronization control unit 17L. The second access control unit 21R also performs control for recording the clip name of the first image signal received from the first synchronization control unit 17L on the second image signal recording mediums 22R and 23R.

Specifically, the first access control unit 21L and the second access control unit 21R share the clip names attached to the respective recording mediums as follows.

The first camera 1 and the second camera 2 first start to record the image signal using the first image signal recording medium 22L inserted into the first slot. At this time, a clip named 190_0001L_01 is created in the recording medium inserted into the first slot of the first camera 1. Similarly, a clip named 190_0001R_01 is created in the recording medium inserted into the first slot of the second camera 2.

When the first camera 1 and the second camera 2 capture a 3D image, and records image signals on the respective image signal recording mediums, information (a portion of "pair-with: ***") of a pair of clips as a 3D image is written to the respective clips. The respective cameras are operated to be switched from the first slot to the second slot while continuously recording a 3D image. At this time, a clip named 190_0001L_02 is created in the recording medium inserted into the second slot of the second camera 2. Similarly, a clip named 190_0001R_02 is created in the recording medium inserted into the second slot of the first camera 1.

Figure 5:
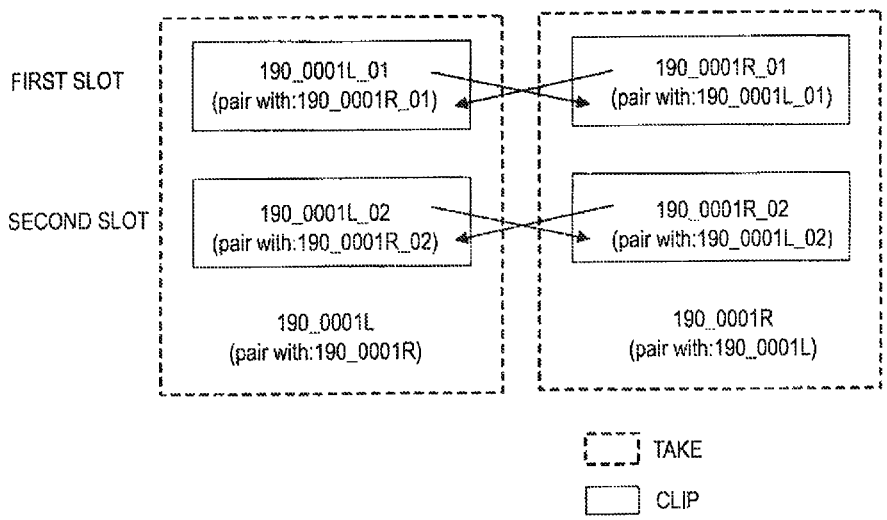
FIG. 5 is an explanatory view showing an operation example when editing a clip file which is recorded on a recording medium to be used in the first camera and the second camera according to the embodiment of the present disclosure.

FIG. 5 shows an operation example when editing a clip file which is recorded in a recording medium to be used in the first camera 1 and the second camera 2.

While the first image signal is being written to the first image signal recording medium 22L, when access is switched to the first image signal recording medium 23L, the first access control unit 21L performs control for recording the first image signal in terms of takes formed by merging clips before and after switching. While the second image signal is being written to the second image signal recording medium 22R, when access is switched to the second image signal recording medium 23R, the second access control unit 21R performs control for recording the second image signal in terms of takes formed by merging clips before and after switching.

If slot switching is performed, and a plurality of clips are created by a single recording operation, from the viewpoint of the format of the recording medium, a plurality of created clips are merged and handled as a single take. The takes created with recording of a 3D image have information of a pair of takes as a 3D image, and the takes of the left and right images are combined using the information of a pair of takes, and can be handled as 3D image data including a 3D image signal.

Figure 6:
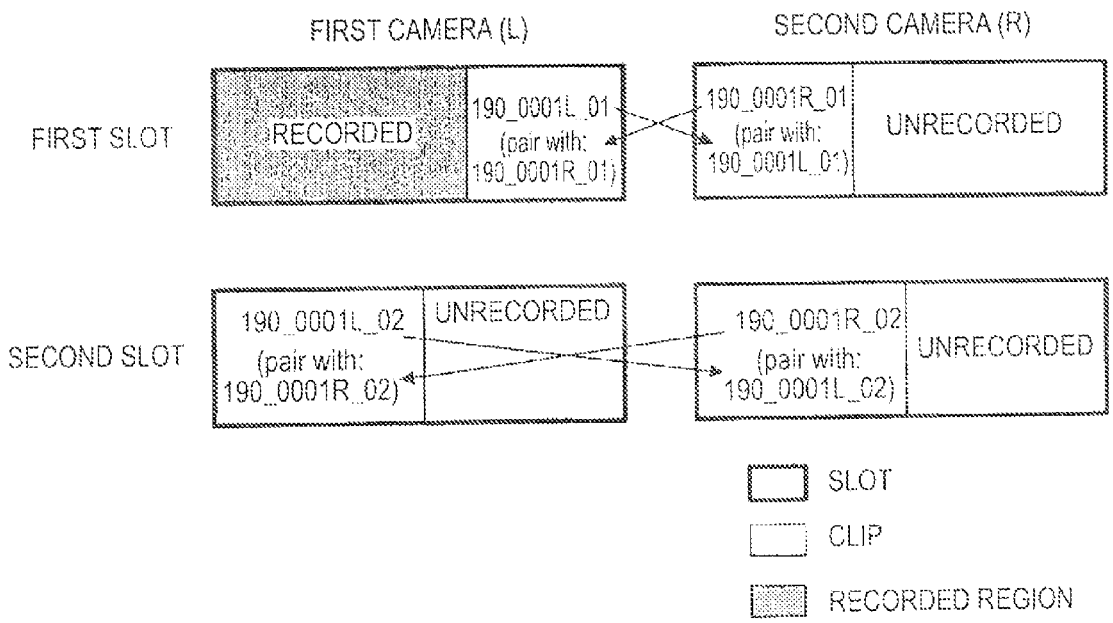
FIG. 6 is an explanatory view showing an example of the storage capacity of a recording medium which changes with slot switching according to the embodiment of the present disclosure.

FIG. 6 shows an example of the storage capacity of a recording medium which changes with slot switching.

It is assumed that the first image signal recording mediums 22L and 23L and the first image signal recording mediums 22R and 23R are inserted into the first and second slots of the first camera 1 and the second camera 2.

There is a case where the remaining capacity of the first image signal recording medium 22L inserted into the first slot of the first camera 1 runs out during recording. At this time, even when there is the remaining capacity of the first image signal recording medium 22L inserted into the first slot of the second camera 2, switching between the first and second slots is performed simultaneously. After switching, a clip named 190_0001L_02 is created in the first image signal recording medium 23L, a clip named 190_0001R_02 is created in the second image signal recording medium 23R, and information of a pair of clips is written to the respective clips. If the remaining capacity of the first image signal recording medium 22L runs out, the slot is automatically switched, and a clip is created in the first image signal recording medium 23L. The image signal recording medium in the second camera 2 is switched in accordance with switching of the image signal recording medium in the first camera 1. For this reason, even when the first image signal recording mediums 22L and 22R are different in the remaining capacity, if the first image signal recording mediums 23L and 23R have the same remaining capacity, clips at the same length are created.

Next, a process example of the stereoscopic imaging system 10, in particular, a process example of the first synchronization control unit 17L will be described with reference to FIGS. 7 to 10. Although in this example, since the first camera 1 is used as a master, description will be provided as to the first synchronization control unit 17L, even when the second camera 2 is used as a master, the second camera 2 can perform the same process as the first synchronization control unit 17L described below.

Figure 7:
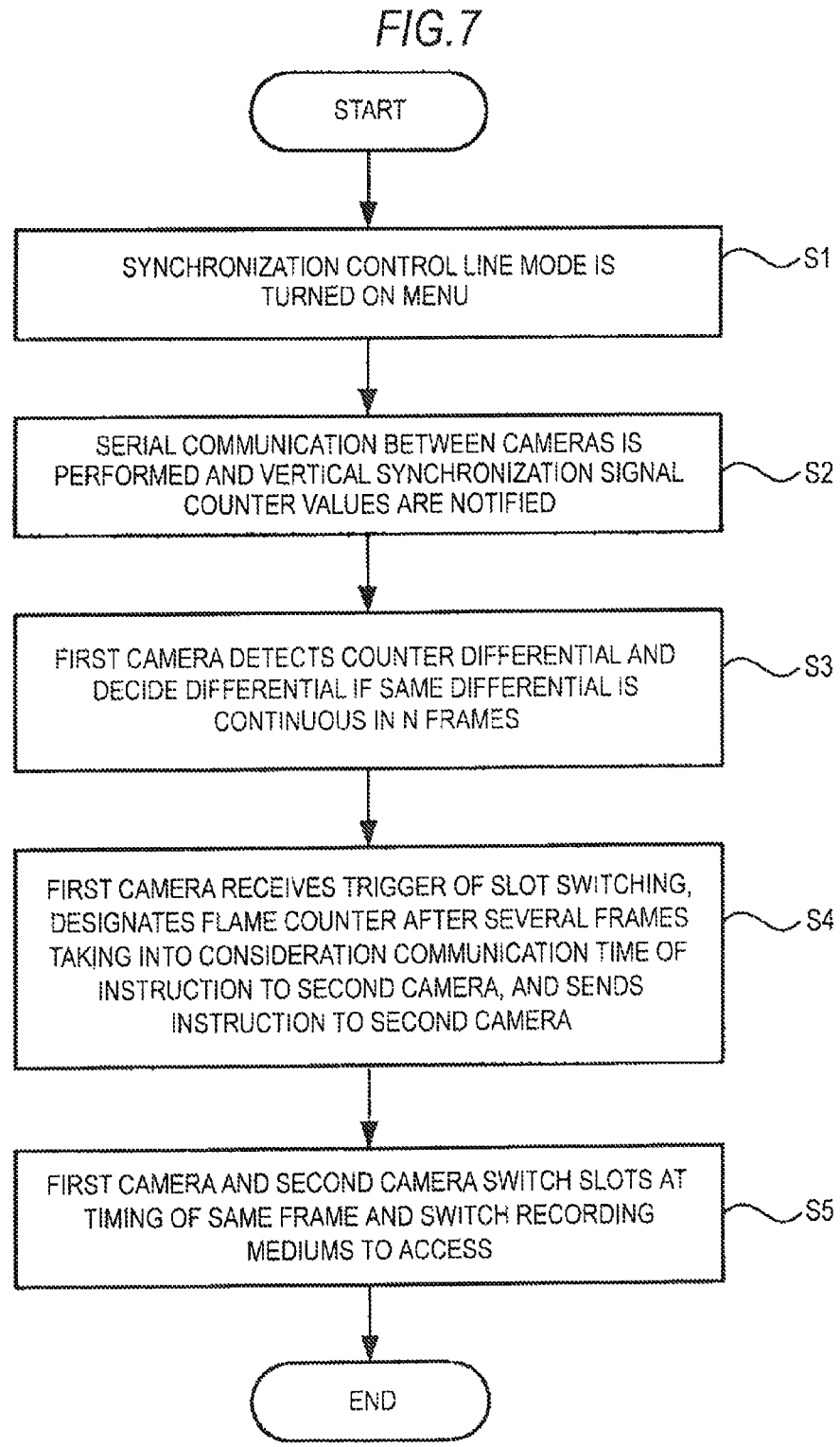
FIG. 7 is a flowchart showing a process example of the first camera according to the embodiment of the present disclosure.

FIG. 7 shows a process example of the first camera 1.

First, if the synchronization control line 3 is connected to the line terminal of the first camera 1 and the second camera 2, a synchronization control line mode is turned on by a user's operation input of the operating unit 11 using a menu screen (not shown) (Step S1). If the synchronization control line mode is turned on, it becomes possible to synchronously perform imaging or image reproduction between the first camera 1 and the second camera 2 in the processing frames of the respective cameras with the master and slave relationship where the first camera 1 is a master and the second camera 2 is a slave. If the synchronization control line mode is turned off, the cameras are operated separately and do not affect each other.

Next, the first camera 1 and the second camera 2 notify the vertical synchronizing signal counter values to each other by serial communication through the synchronization control line 3 (Step S2). At this time, the first synchronization control unit 17L of the first camera 1 detects the differential between the vertical synchronizing signal counter value of the host camera and the vertical synchronizing signal counter value received from the second camera 2. If the same differential is continuous in N frames (in this example, five frames), the first camera 1 decides the differential (Step S3).

Next, the first camera 1 receives a slot switching instruction with an operation signal based on an operation input of the operating unit 11. In this example, it is assumed that "a slot switching instruction" is received as "an instruction to start or stop processing". With this instruction, the first camera 1 designates the counter value of a processing frame after several frames taking into consideration the communication time necessary for instructing the second camera 2, and sends an operation instruction to the second camera 2 (Step S4). In the timing chart shown in FIGS. 3A to 3C, this is performed after five frames.

In this way, the first camera 1 and the second camera 2 switch the slots at the timings of the same frames in accordance with the timings of the vertical synchronizing signals generated at the same timing to switch the recording mediums to access (Step S5).

Next, a process example of an interface of the respective units in the first synchronization control unit 17L will be described with reference to FIGS. 8 to 10. In the following description, a process in which the first synchronization control unit 17L performs data input and output with the respective control units is called "an interface process".

Figure 8:
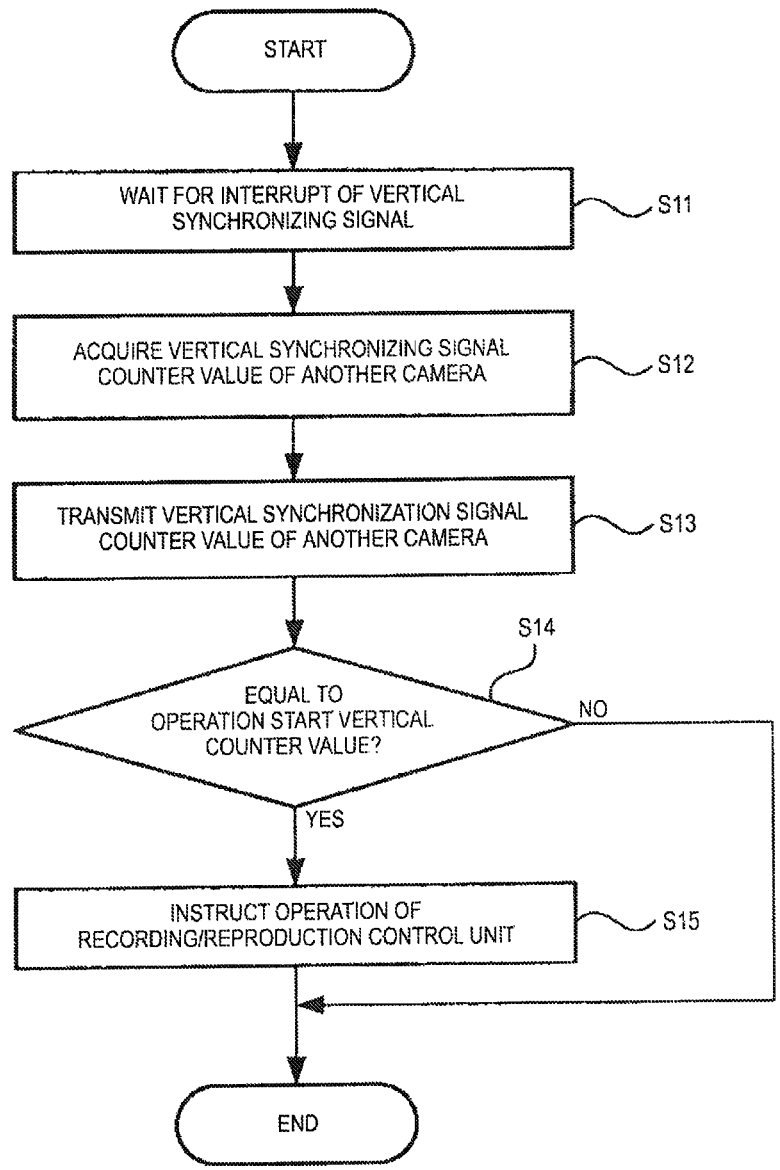
FIG. 8 is a flowchart showing a process example of an interface of a camera control unit in a first synchronization control unit according to the embodiment of the present disclosure.

FIG. 8 shows a process example of an interface of the first imaging control unit 13L in the first synchronization control unit 17L.

First, the first synchronization control unit 17L waits for an interrupt of the vertical synchronizing signal generated by the first imaging device (Step S11). If the interrupt of the vertical synchronizing signal occurs, the first vertical synchronizing signal counter 20L writes the vertical synchronizing signal counter value to the RAM 14. The first synchronization control unit 17L acquires the vertical synchronizing signal counter value from the RAM 14 (Step S12).

After the first camera 1 is powered on, the vertical synchronizing signal counter value is counted up from "0" to "255" by the first vertical synchronizing signal counter 20L. The vertical synchronizing signal counter value when the first vertical synchronizing signal counter 20L starts counting is a random value. If the synchronization of the first camera 1 and the second camera 2 is stable, the differential Δ has a fixed value, and accordingly, the absolute value of the vertical synchronizing signal counter value when the operation starts is calculated. For this reason, it is not necessary to reset the vertical synchronizing signal counter value to "0".

Next, the first synchronization control unit 17L transmits the vertical synchronizing signal counter value read from the RAM 14 to the second camera 2 (Step S13). The process for transmitting the vertical synchronizing signal counter value is performed by a module which processes the interface of the first imaging control unit 13L. The first synchronization control unit 17L requests the transmission/reception control unit 19 to perform transmission, so that the transmission process is performed.

Next, the first synchronization control unit 17L determines whether or not the vertical synchronizing signal counter value of the host camera is equal to the vertical synchronizing signal counter value when the second camera 2 starts an operation (Step S14). When the values are the same, the first synchronization control unit 17L instructs the reproduction control unit 15 or the recording control unit 16 to reproduce or record an image (Step S15). When the values are different, the first synchronization control unit 17L does not perform any processing, and ends the process.

Figure 9:
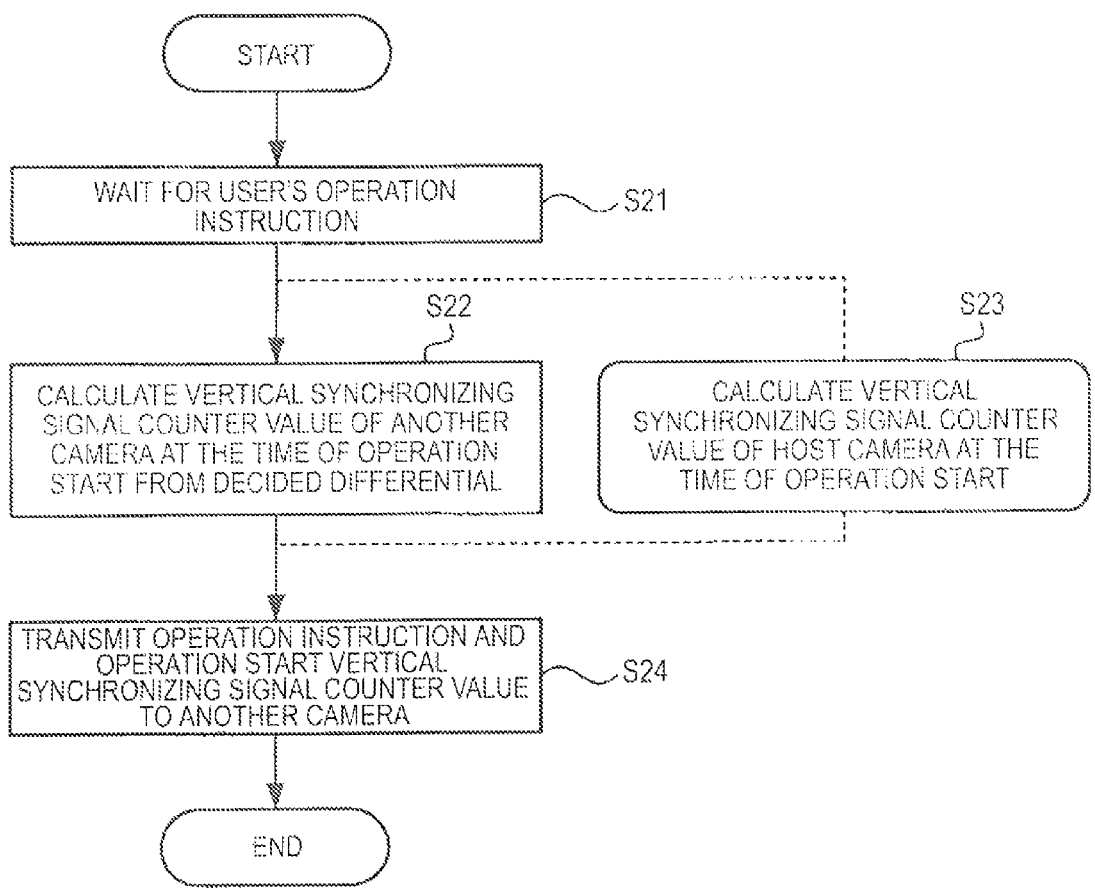
FIG. 9 is a flowchart showing a process example of an interface of a user interface control unit in the first synchronization control unit according to the embodiment of the present disclosure.

FIG. 9 shows a process example of an interface of the user interface control unit 12 in the first synchronization control unit 17L.

First, the first synchronization control unit 17L waits for an operation instruction with an operation signal based on a user's operation input (Step S21). The timing of the processing frame at which the operation instruction comes from the user is not defined. For, this reason, after the first synchronization control unit 17L receives the operation instruction, the genlock is performed such that the vertical synchronizing signals are generated at the same timing between the first camera 1 and the second camera 2, thereby starting the instructed operation from the head of the processing frame which is the generation timing of the vertical synchronizing signal.

The first camera 1 sends the operation signal to the second camera 2 to notify the operation instruction based on the operation input of the operating unit 11. The timing at which the operation signal arrives at the second camera 2 is not defined, and the timing at which the operation is actually performed is not known. Accordingly, the first camera 1 and the second camera 2 calculates the differential Δ from the vertical synchronizing signal counter values counted by the first vertical synchronizing signal counter 20L and the second vertical synchronizing signal counter 20R in advance. Therefore, the vertical synchronizing signal counter values with which the first camera 1 and the second camera 2 can synchronously start the operations are calculated taking into consideration the differential Δ.

Next, the first synchronization control unit 17L of the first camera 1 calculates the vertical synchronizing signal counter value when the second camera 2 starts the operation from the differential Δ decided by the vertical synchronizing signal counter value received from the second camera 2 (Step S22). The first synchronization control unit 17L of the first camera 1 calculates the vertical synchronizing signal counter value when the first camera 1 starts the operation in parallel with the processing in Step S22 (Step S23).

In the step next to Step S21, a broken line which branches off to Step S23 means the processing which is performed when the first camera 1 is a slave. This processing is provided because the processing to be performed changes depending on whether the parameter of the operation instruction received from the operating unit 11 is the counter value of the host camera or the counter value of another camera. The first synchronization control unit 17L transmits an operation signal when an operation instruction is issued or the vertical synchronizing signal counter value when an operation starts to the second camera 2 (Step S24), and ends the process.

Figure 10:
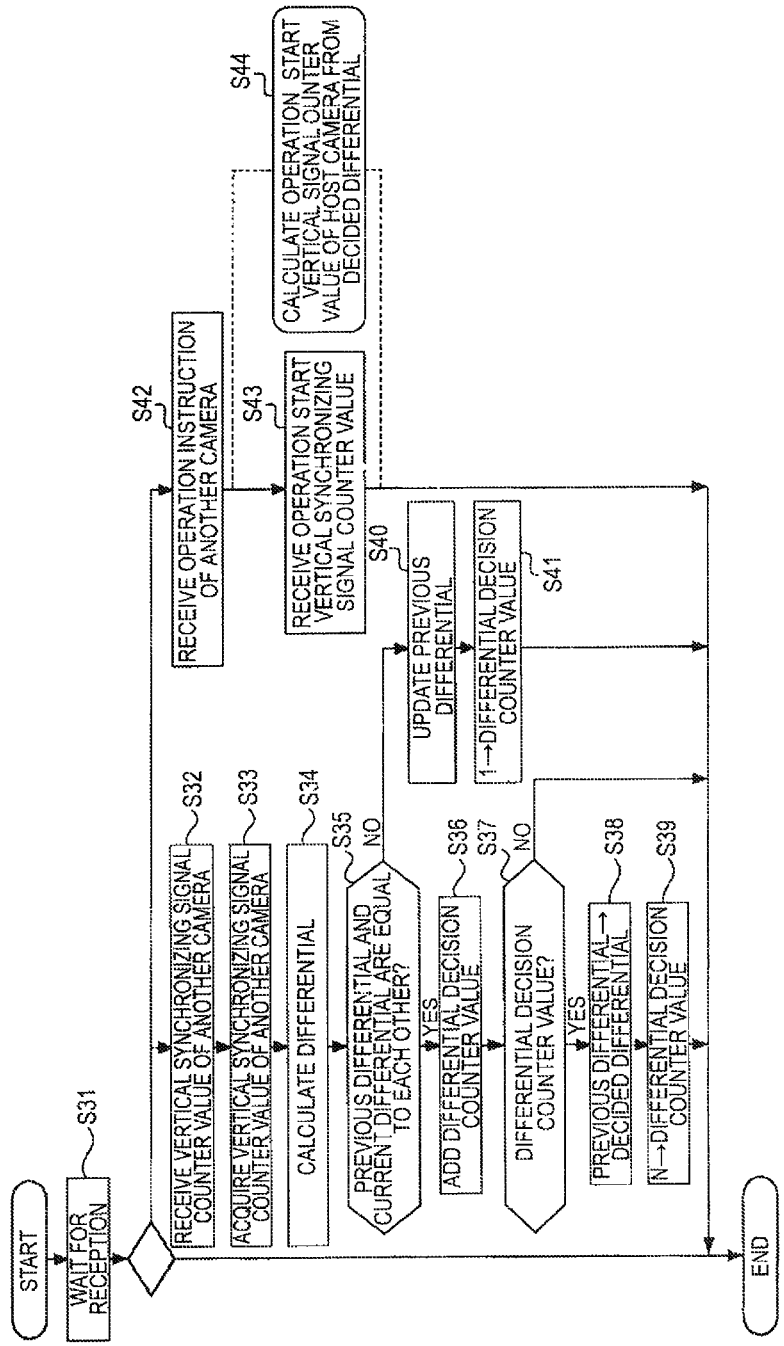
FIG. 10 is a flowchart showing a process example of an interface of a transmission/reception control unit in the first synchronization control unit according to the embodiment of the present disclosure.

FIG. 10 shows a process example of an interface of the transmission/reception control unit 19 in the first synchronization control unit 17L.

First, the first synchronization control unit 17L of the first camera 1 waits for reception of the vertical synchronizing signal counter value which will be received from the transmission/reception control unit 19 (Step S31). If the vertical synchronizing signal counter value is not received from the second camera 2, the process ends.

If the transmission/reception control unit 19 receives the vertical synchronizing signal counter value from the second camera 2 (Step S32), the transmission/reception control unit 19 writes the vertical synchronizing signal counter value to the RAM 18. Thereafter, the first synchronization control unit 17L acquires the vertical synchronizing signal counter value from the RAM 18 (Step S33). The first synchronization control unit 17L calculates the differential Δ between the vertical synchronizing signal counter value of the host camera read from the RAM 14 and the vertical synchronizing signal counter value of the second camera 2 read from the RAM 18 (Step S34).

The first synchronization control unit 17L calculates the differential Δ in the respective frames, and the latest differential Δ is calculated in Step S34. In the following description, since the differential calculated by the first synchronization control unit 17L before one frame is the value which is calculated from the vertical synchronizing signal counter value before one frame, the differential is called "previous differential", and the differential Δ calculated in Step S34 is called "current differential". The first synchronization control unit 17L determines whether or not the current differential is equal to the previous differential (Step S35). Since the first synchronization control unit 17L determines whether or the differential Δ has a constant value multiple times, a differential decision counter value to which the number of times is added when the current differential and the previous differential are equal to each other is written to the RAM 14 (Step S36).

The first synchronization control unit 17L determines whether the differential Δ is a value which can increase the differential decision counter value or an abnormal value corresponding to the second differential Δ' (Step S37). When the differential Δ is the abnormal value, the processing is not performed. When the differential Δ is the value which can increase the differential decision counter value, in Step S38, the previous differential is overwritten with the decided differential.

In this example, in order to decide the differential Δ of the vertical synchronizing signal counter values, the differential decision counter value is used. For example, as shown in FIG. 3C, when a communication packet which is transmitted through the synchronization control line 3 is delayed, there is a case where the current differential and the previous differential are different. In this case, since the differential Δ calculated as the current differential can be discarded, when the current differential and the previous differential are not equal to each other continuously N times (in this example, five times), control is performed such that the differential is not regarded as a correct differential Δ.

When the differential Δ is changed, the first synchronization control unit 17L temporarily writes the changed differential Δ to the RAM 14 as "previous differential". Thereafter, if the same differential Δ is calculated, the differential decision counter value in the RAM 14 is incremented by 1. When the current differential and the previous differential continuously have the same value, the differential decision counter value continues to be incremented every time. In this way, when the current differential and the previous differential have the same value over the N frames, a "decided differential" represented by the above-described differential Δ is calculated (Step S38). When the current differential and the previous differential continuously have the same value N times, the value "N" which is the differential decision counter value is overwritten with the differential decision counter value, and the process ends (Step S39). The value "N" is incremented each time the current differential and the previous differential have the same value.

In Step S35, when the previous differential and the current differential are different, after the previous differential written to the RAM 14 is updated to the current differential (Step S40), and the differential decision counter value is then rewritten to the initial value "1" (Step S41). Thereafter, the processing of Steps S31 to S39 is repeated to calculate whether the value represented by the current differential becomes the decided differential Δ.

There is a case where the first camera 1 is set as a slave and the second camera 2 is set as a master. At this time, the transmission/reception control unit 19 of the first camera 1 receives an operation signal from the second camera 2, and the first synchronization control unit 17L of the first camera 1 analyzes an operation which is instructed by the second camera 2 (Step S42). The transmission/reception control unit 19 of the first camera 1 receives the vertical synchronizing signal counter value when the second camera 2 starts the operation (Step S43), and writes the vertical synchronizing signal counter value to the RAM 18 of the first camera 1. In parallel with the processing in Step S43, the first synchronization control unit 17L of the first camera 1 calculates the vertical synchronizing signal counter value when the operation of the host camera starts from the decided differential (Step S44), and performs an operation controlled by the second camera 2.

According to the stereoscopic imaging system 10 of the above-described embodiment, the generation timings of the vertical synchronizing signals match each other using the first camera 1 and the second camera 2 with the master and slave relationship, and the differential Δ of the vertical synchronizing signal counter values is then calculated. Accordingly, it becomes possible for the first camera 1 and the second camera 2 to switch the recording mediums at the same timing taking into consideration the differential Δ. For this reason, it is not necessary to perform edition taking into consideration the situation that the clip division timing with switching of the recording mediums differs between the recording mediums. Accordingly, the clips created in the switched recording mediums of the first camera 1 and the second camera 2 have the length ratio of 1:1, thereby ensuring that imaging is performed at the same timing. Since the clip creation start timing is the same in terms of frames, it becomes easy to temporally match the frames of the left and right images when reproducing or editing a 3D image.

At this time, the number of frames in which slot switching is actually performed can be defined, and the two cameras can simultaneously perform slot switching between the first and second slots when the number of frames is reached. At this time, the user performs only an operation input on the operating unit 11 of the first camera 1 serving as a master, so that the second camera 2 performs the same operation as the first camera 1. Accordingly, it is possible to exactly control slot switching of the two cameras in accordance with the start timings of the processing frames.

The start timings of the processing frames match the generation timings of the vertical synchronizing signals of the image signal, thereby accurately matching the operations in the processing frames. For this reason, after the subject is imaged, it is not necessary to perform the operation to match the processing frames, and to efficiently perform the edition operation. During image reproduction, it is possible to synchronously perform the reproduction operation in the two cameras, and to eliminate a sense of discomfort in a stereoscopic image due to shifts in the processing frames.

The differential Δ is calculated equal to or greater than a predetermined number of times, and the reliability of the value is high. For this reason, it is possible to easily match the processing frames using the differential Δ. If the user operates the first camera 1, the second camera 2 is automatically operates synchronously, so that the user may be unaware of matching the timing of slot switching.

Since the second differential Δ' obtained as an abnormal value is discarded, there is no influence of the second differential Δ' on the synchronization control. From this point, it is possible to increase reliability of the synchronization control of the first camera 1 and the second camera 2.

<2. Modification>

Although in the above-described embodiment, an example where the first camera 1 and the second camera 2 are arranged in the up-down direction has been described, if the housings of the first camera 1 and the second camera 2 are reduced in size, the first camera 1 and the second camera 2 may be installed in parallel in the horizontal direction.

Although an example where the synchronization control line 3 is used as a wired cable which is connected to the transmission/reception control unit 19 has been described, the transmission/reception control unit 19 may be an adapter which corresponds to the wireless communication standard, thereby transmitting a communication packet in a wireless manner.

Although in the above-described embodiment, an example where the present disclosure is applied to the stereoscopic imaging system 10 (see FIG. 1) which includes the first camera 1 and the second camera 2 has been described, in a single twin-lens camera, the synchronization control for matching the timing of slot switching may be performed. The second synchronization control unit 17R may define a master and slave relationship where the first access control unit 21L is a slave and the second access control unit 21R is a master. When imaging is performed, the right image signal may be the first image signal, and the left image signal may be the second image signal.

Figure 11:
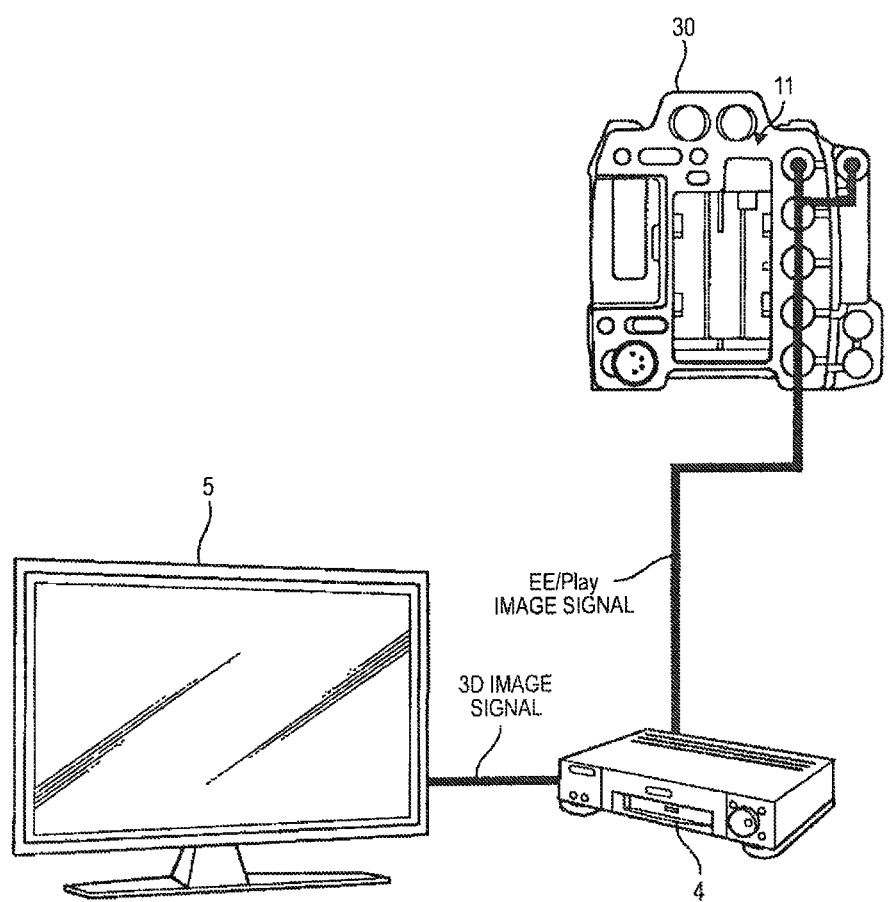
FIG. 11 is an appearance diagram showing a modification of the stereoscopic imaging camera according to the embodiment of the present disclosure.

FIG. 11 shows an external configuration example of a stereoscopic imaging camera 30.

Similarly to the stereoscopic imaging system 10, the stereoscopic imaging camera 30 can display a 2D or 3D image on the display device 5 through the signal conversion device 4. The stereoscopic imaging camera 30 is a twin-lens camera which includes two lenses (not shown), and a stereoscopic image can be captured using the single camera. The stereoscopic imaging camera 30 includes the internal blocks of the first camera 1 and the second camera 2 in the stereoscopic imaging system 10. In this way, even when an imaging system which captures a left image and a right image corresponding to the first camera 1 and the second camera 2 is put in a single camera, it becomes possible to perform slot switching while ensuring frame precision by the above-described slot switching method. In this way, the recording or reproduction control method of this example is not limited to an imaging system which uses a plurality of cameras and may be applied to a single camera which captures left and right images simultaneously.

A sequence of processing in the above-described embodiment can be executed by hardware or software. When a sequence of processing is executed by software, a sequence of processing can be executed by a computer in which a program constituting the software is incorporated in the dedicated hardware or a computer in which a program for executing various functions is installed. For example, a program constituting desired software may be installed in a general-purpose personal computer or the like so as to execute a sequence of processing.

A recording medium on which a program code of the software for realizing the functions of the above-described embodiment is recorded may be supplied to a system or an apparatus. Of course, a computer (or a control device, such as a CPU) of the system or the apparatus reads and executes the program code stored in the recording medium, thereby realizing the functions.

For example, a flexible disk, a hard disk, an optical disk, a magneto-optical disk, a CD-ROM, a CD-R, a magnetic tape, a nonvolatile memory card, a ROM, or the like may be used as the recording medium for supplying the program code in this case.

The program code read by the computer is executed, thereby realizing the functions of the above-described embodiment. An OS or the like which is operating on the computer executes apart or the whole of the actual processing on the basis of an instruction of the program code. The case where the functions of the above-described embodiment are realized through this processing is also contained herein.

The present disclosure is not limited to the above-described embodiment, and various applications and modifications may be of course made without departing from the subject matter of the present disclosure described in the appended claims.

The present disclosure may be implemented as the following configurations.

(1) A stereoscopic imaging system including a first imaging control unit which controls the operation of a first imaging device outputting a first image signal in a first processing frame according to incident light on a subject incident through a first lens, a first access control unit which controls access to a plurality of first image signal recording mediums recording the first image signal in the first processing frame, a second imaging control unit which controls the operation of a second imaging device arranged at a predetermined distance from the first lens to output a second image signal in a second processing frame according to incident light on the subject incident through a second lens, a second access control unit which controls access to a plurality of second image signal recording mediums recording the second image signal in the second processing frame, a first synchronization control unit which, if the remaining capacity of a first image signal recording medium to be accessed by the first access control unit is insufficient, notifies the timing of switching access to another first image signal recording medium different from the first image signal recording medium, and a second synchronization control unit which performs control for switching access to another second image signal recording medium different from the second image signal recording medium to be accessed by the second access control unit in synchronization with the notified timing.

(2) The stereoscopic imaging system described in (1), wherein the first access control unit performs control for recording the first image signal on the first image signal recording medium in terms of clips, notifying a clip name of the first image signal to the second synchronization control unit, and recording a clip, name of the second image signal received from the second synchronization control unit on the first image signal recording medium, and the second access control unit performs control for recording the second image signal on the second image signal recording medium in terms of clips, notifying the clip name of the second image signal to the first synchronization control unit, and recording the clip name of the first image signal received from the first synchronization control unit on the second image signal recording medium.

(3) The stereoscopic imaging system described in (1) or (2), further including a first counting unit which counts the number of generated first vertical synchronizing signals to be inserted for the first processing frame by the first imaging device, and a second counting unit which counts the number of generated second vertical synchronizing signals to be inserted for the second processing frame by the second imaging device, wherein the first synchronization control unit calculates the number of generated vertical synchronizing signals to be inserted for the second processing frame from a differential between the number of generated vertical synchronizing signals to be inserted for the second processing frame and the number of generated vertical synchronizing signals to be inserted for the first processing frame when the first access control unit switches access from the first image signal recording medium to another first image signal recording medium, and when a predetermined period elapses after the timing of switching access to the first image signal recording medium has been notified to the second access control unit, the first access control unit performs control for switching access to the first image signal recording medium on the basis of the number of generated vertical synchronizing signals to be inserted for the second processing frame, and the second synchronization control unit informs the first synchronization control unit of the number of generated vertical synchronizing signals to be inserted for the second processing frame, and when the predetermined period elapses after the notification has been received from the first synchronization control unit, the second access control unit performs control for switching access from the second image signal recording medium to another second image signal recording medium.

(4) The stereoscopic imaging system described in (3), wherein, while the first and second image signals are being written to first and second image signal recording mediums, when access is switched to other first and second image signal recording mediums, the first and second access control units perform control for recording the first and second image signals in terms of takes formed by merging clips before and after switching.

(5) The stereoscopic imaging system described in any one of (1) to (4), wherein the first counting unit counts the number of generated vertical synchronizing signals by the first imaging device as the number of frames of the first processing frame, and the first synchronization control unit matches the generation timings of the vertical synchronizing signal of the first processing frame and the vertical synchronizing signal of the second processing frame in advance, and when the second synchronization, control unit counts the number of generated second vertical synchronizing signals to be inserted for the second processing frame as the number of frames of the second processing frame, the second imaging device notifies the second synchronization control unit of the number of frames obtained by adding the number of frames of the second processing frame, which is calculated when the differential in the number of frames between the number of frames of the second processing frame received from the second synchronization control unit each time the second vertical synchronizing signal is generated and the number of frames of the first processing frame is constant in a plurality of frame periods, and the plurality of frame periods as the timing at which the operation of the second synchronization control unit starts.

(6) The stereoscopic imaging system described in any one of (1') to (5), further including an operating unit which instructs an operation to switch access of the first image signal recording medium according to an operation input, wherein the first synchronization control unit notifies the instruction by the operation input to the second synchronization control unit, and performs the notified operation when the predetermined pericd elapses after the operation input has been made, and the second synchronization control unit switches access of the second image signal recording medium when the predetermined period elapses after the notification has been received from the first synchronization control unit.

(7) The stereoscopic imaging system described in any one of (1) to (6), wherein, when the number of frames of the first processing frame is unable to be notified to the second synchronization control unit within the period of the first processing frame or when the number of frames of the second processing frame is unable to be received from the second synchronization control unit within the period of the first processing frame, the first synchronization control unit notifies the number of frames of the first processing frame to the second synchronization control unit over a frame period next to the first processing frame or receives the number of frames of the second processing frame from the second synchronization control unit.

(8) The stereoscopic imaging system described in anyone of (1) to (7), wherein, when a second differential different from the differential obtained equal to or greater than a predetermined number of times is obtained less than the predetermined number of times, the first synchronization control unit discards the second differential.

(9) The stereoscopic imaging system described in any one of (1) to (8), wherein the operation instructed by the operation input of the operating unit includes either imaging start/stop or access switching of the first and second image signal recording mediums, and the first and second processing frames include either an imaging frame or a reproduction frame.

(10) A recording control method including controlling the operation of a first imaging device outputting a first image signal in a first processing frame according to incident light on a subject incident through a first lens, causing a first access control unit to control access to a plurality of first image signal recording mediums recording the first image signal in the first processing frame, controlling the operation of a second imaging device arranged at a predetermined distance from the first lens to output a second image signal in a second processing frame according to incident light on the subject incident through a second lens, causing a second access control unit to control access to a plurality of second image signal recording mediums recording the second image signal in the second processing frame, if the remaining capacity of a first image signal recording medium to be accessed by the first access control unit is insufficient, notifying the timing of switching access to another first image signal recording medium different from the first image signal recording medium, and performing control for switching access to another second image signal recording medium different from the second image signal recording medium to be accessed by the second access control unit in synchronization with the notified timing.

(11) A stereoscopic image reproduction system including a first access control unit which controls access to a plurality of first image signal recording mediums reproducing a first image signal in a first processing frame, a second access control unit which controls access to a plurality of second image signal recording mediums reproducing a second image signal in a second processing frame, a first synchronization control unit which, if a file of the first image signal which is reproduced from the first image signal recording medium to be accessed by the first access control unit is not present, notifies the timing of switching access to another first image signal recording medium different from the first image signal recording medium, and a second synchronization control unit which performs control for switching access to another second image signal recording medium different from the second image signal recording medium to be accessed by the second access control unit in synchronization with the notified timing.

(12) A reproduction control method including causing a first access control unit to control access to a plurality of first image signal recording mediums reproducing a first image signal in a first processing frame, causing a second access control unit to control access to a plurality of second image signal recording mediums reproducing a second image signal in a second processing frame, if a file of the first image signal which is reproduced from a first image signal recording medium to be accessed by the first access control unit is not present, notifying the timing of switching access to another first image signal recording medium different from the first image signal recording medium, and performing control for switching access to another second image signal recording medium different from the second image signal recording medium to be accessed by the second access control unit in synchronization with the notified timing.

The present disclosure contains subject matter related to that disclosed in Japanese Priority Patent Application JP 2011-160642 filed in the Japan Patent Office on Jul. 22, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A stereoscopic imaging system comprising:
a first imaging control unit which controls the operation of a first imaging device outputting a first image signal in a first processing frame according to incident light on a subject incident through a first lens;
a first access control unit which controls access to a plurality of first image signal recording mediums recording the first image signal in the first processing frame;
a second imaging control unit which controls the operation of a second imaging device arranged at a predetermined distance from the first lens to output a second image signal in a second processing frame according to incident light on the subject incident through a second lens;
a second access control unit which controls access to a plurality of second image signal recording mediums recording the second image signal in the second processing frame;
a first synchronization control unit which, if the remaining capacity of a first image signal recording medium to be accessed by the first access control unit is insufficient, notifies the timing of switching access to another first image signal recording medium different from the first image signal recording medium; and
a second synchronization control unit which performs control for switching access to another second image signal recording medium different from the second image sig- nal recording medium to be accessed by the second access control unit in synchronization with the notified timing.

2. The stereoscopic imaging system according to claim 1, wherein the first access control unit performs control for recording the first image signal on the first image signal recording medium in terms of clips, notifying a clip name of the first image signal to the second synchronization control unit, and recording a clip name of the second image signal received from the second synchronization control unit on the first image signal recording medium, and the second access control unit performs control for recording the second image signal on the second image signal recording medium in terms of clips, notifying the clip name of the second image signal to the first synchronization control unit, and recording the clip name of the first image signal received from the first synchronization control unit on the second image signal recording medium.

3. The stereoscopic imaging system according to claim 2, further comprising:

a first counting unit which counts the number of generated first vertical synchronizing signals to be inserted for the first processing frame by the first imaging device; and a second counting unit which counts the number of generated second vertical synchronizing signals to be inserted for the second processing frame by the second imaging device, wherein the first synchronization control unit calculates the number of generated vertical synchronizing signals to be inserted for the second processing frame from a differential between the number of generated vertical synchronizing signals to be inserted for the second processing frame and the number of generated vertical synchronizing signals to be inserted for the first processing frame when the first access control unit switches access from the first image signal recording medium to another first image signal recording medium, and when a predetermined period elapses after the timing of switching access to the first image signal recording medium has been notified to the second access control unit, the first access control unit performs control for switching access to the first image signal recording medium on the basis of the number of generated vertical synchronizing signals to be inserted for the second processing frame, and the second synchronization control unit informs the first synchronization control unit of the number of generated vertical synchronizing signals to be inserted for the second processing frame, and when the predetermined period elapses after the notification has been received from the first synchronization control unit, the second access control unit performs control for switching access from the second image signal recording medium to another second image signal recording medium.

4. The stereoscopic imaging system according to claim 3, wherein, while the first and second image signals are being written to the first and second image signal recording mediums, when access is switched to other first and second image signal recording mediums, the first and second access control units perform control for recording the first and second image signals in terms of takes formed by merging clips before and after switching.

5. The stereoscopic imaging system according to claim 4, wherein the first counting unit counts the number of generated vertical synchronizing signals of the first imaging device as the number of frames of the first processing frame, and the first synchronization control unit matches the generation timings of the vertical synchronizing signal of the first processing frame and the vertical synchronizing signal of the second processing frame in advance, and when the second synchronization control unit counts the number of generated second vertical synchronizing signals to be inserted for the second processing frame as the number of frames of the second processing frame, the second imaging device notifies the second synchronization control unit of the number of frames obtained by adding the number of frames of the second processing frame, which is calculated when the differential in the number of frames between the number of frames of the second processing frame received from the second synchronization control unit each time the second vertical synchronizing signal is generated and the number of frames of the first processing frame is constant in a plurality of frame periods, and the plurality of frame periods as the timing at which the operation of the second synchronization control unit starts.

6. The stereoscopic imaging system according to claim 5, further comprising:

an operating unit which instructs an operation to switch access of the first image signal recording medium according to an operation input, wherein the first synchronization control unit notifies the instruction by the operation input to the second synchronization control unit, and performs the notified operation when the predetermined period elapses after the operation input has been made, and the second synchronization control unit switches access of the second image signal recording medium when the predetermined period elapses after the notification has been received from the first synchronization control unit.

7. The stereoscopic imaging system according to claim 6, wherein, when the number of frames of the first processing frame is unable to be notified to the second synchronization control unit within the period of the first processing frame or when the number of frames of the second processing frame is unable to be received from the second synchronization control unit within the period of the first processing frame, the first synchronization control unit notifies the number of frames of the first processing frame to the second synchronization control unit over a frame period next to the first processing frame or receives the number of frames of the second processing frame from the second synchronization control unit.

8. The stereoscopic imaging system according to claim 7, wherein, when a second differential different from the differential obtained equal to or greater than a predetermined number of times is obtained less than the predetermined number of times, the first synchronization control unit discards the second differential.

9. The stereoscopic imaging system according to claim 8, wherein the operation instructed by the operation input of the operating unit includes either imaging start/stop or access switching of the first and second image signal recording mediums, and the first and second processing frames include either an imaging frame or a reproduction frame.

10. A recording control method comprising:

controlling the operation of a first imaging device outputting a first image signal in a first processing frame according to incident light on a subject incident through a first lens;

causing a first access control unit to control access to a plurality of first image signal recording mediums recording the first image signal in the first processing frame;

controlling the operation of a second imaging device arranged at a predetermined distance from the first lens to output a second image signal in a second processing frame according to incident light on the subject incident through a second lens;

causing a second access control unit to control access to a plurality of second image signal recording mediums recording the second image signal in the second processing frame;

if the remaining capacity of a first image signal recording medium to be accessed by the first access control unit is insufficient, notifying the timing of switching access to another first image signal recording medium different from the first image signal recording medium; and performing control for switching access to another second image signal recording medium different from the second image signal recording medium to be accessed by the second access control unit in synchronization with the notified timing.

11. A stereoscopic image reproduction system comprising:

a first access control unit which controls access to a plurality of first image signal recording mediums reproducing a first image signal in a first processing frame;

a second access control unit which controls access to a plurality of second image signal recording mediums reproducing a second image signal in a second processing frame;

a first synchronization control unit which, if a file of the first image signal which is reproduced from the first image signal recording medium to be accessed by the first access control unit is not present, notifies the timing of switching access to another first image signal recording medium different from the first image signal recording medium; and a second synchronization control unit which performs control for switching access to another second image signal recording medium different from the second image signal recording medium to be accessed by the second access control unit in synchronization with the notified timing.

12. A reproduction control method comprising:

causing a first access control unit to control access to a plurality of first image signal recording mediums reproducing a first image signal in a first processing frame;

causing a second access control unit to control access to a plurality of second image signal recording mediums reproducing a second image signal in a second processing frame;

if a file of the first image signal which is reproduced from the first image signal recording medium to be accessed by the first access control unit is not present, notifying the timing of switching access to another first image signal recording medium different from the first image signal recording medium; and performing control for switching access to another second image signal recording medium different from the second image signal recording medium to be accessed by the second access control unit in synchronization with the notified timing.

\* \* \* \* \*